US009516163B2

(12) United States Patent
Hickey et al.

(10) Patent No.: US 9,516,163 B2
(45) Date of Patent: Dec. 6, 2016

(54) ANALYZING TELEPHONE CALLS

(71) Applicant: International Business Machines Corporation, Armonk, NY (US)

(72) Inventors: Donna M. Hickey, Longmont, CO (US); Randy S. Johnson, O'Fallon, MO (US); Tedrick N. Northway, Wood River, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/547,437

(22) Filed: Nov. 19, 2014

(65) Prior Publication Data
US 2016/0142540 A1 May 19, 2016

(51) Int. Cl.
*H04M 3/436* (2006.01)
*H04M 3/42* (2006.01)

(52) U.S. Cl.
CPC ......... *H04M 3/436* (2013.01); *H04M 3/42059* (2013.01)

(58) Field of Classification Search
CPC ........ H04M 1/66; H04M 1/663; H04M 1/667; H04M 3/436; H04M 3/42059; H04M 3/2281; H04M 2203/2011
USPC .................................................... 379/210.02
See application file for complete search history.

(56) References Cited

U.S. PATENT DOCUMENTS

| 5,467,388 A | 11/1995 | Redd, Jr. et al. |
| 5,631,951 A | 5/1997 | Chen |
| 5,875,239 A | 2/1999 | Koralewski et al. |
| 6,456,706 B1 | 9/2002 | Blood et al. |
| 6,763,098 B1 | 7/2004 | Allen et al. |
| 6,859,528 B1 | 2/2005 | Welte |

(Continued)

FOREIGN PATENT DOCUMENTS

| EP | 0510411 A2 | 10/1992 |
| EP | 0957623 A2 | 11/1999 |

(Continued)

OTHER PUBLICATIONS

Ahamad, T., "Feasibility and Importance of Wireless Intelligent Network (WIN)", Oriental Journal of Computer Science & Technology, vol. 4(1), 205-208 (2011), Feb. 2, 2011.

(Continued)

*Primary Examiner* — Ahmad F Matar
*Assistant Examiner* — Jirapon Intavong
(74) *Attorney, Agent, or Firm* — Christopher McLane; Daniel R. Simek

(57) ABSTRACT

The method includes receiving a telephone call from a first client device that is intended for a second client device. The method further includes identifying data associated with the first client device comprising at least one of: a telephone number, a name of a user associated with the first client device, an address of the user, and a business name associated with the first client device. The method further includes responsive to determining that the identified data associated with the first client device does match data stored in a database, determining, by one or more computer processors, whether to block the telephone call from the first client device to the second client device based on information comprising historical data associated with the first client device and preset information of the second client device.

7 Claims, 4 Drawing Sheets

(56) References Cited

U.S. PATENT DOCUMENTS

| | | |
|---|---|---|
| 7,379,544 B2 | 5/2008 | Katz |
| 8,917,843 B2 * | 12/2014 | Sharpe ................ H04M 3/4365 |
| | | 379/142.15 |
| 2002/0085700 A1 | 7/2002 | Metcalf |
| 2003/0072426 A1 | 4/2003 | Davidson et al. |
| 2006/0291641 A1 * | 12/2006 | Barclay et al. .......... 379/211.03 |
| 2007/0039040 A1 * | 2/2007 | McRae et al. ..................... 726/4 |
| 2009/0070334 A1 * | 3/2009 | Callahan ............... G06F 21/604 |
| 2009/0097630 A1 | 4/2009 | Fotta |
| 2009/0202057 A1 * | 8/2009 | Tartarelli .......... H04L 29/06027 |
| | | 379/142.04 |
| 2010/0157853 A1 * | 6/2010 | Li et al. ........................ 370/271 |
| 2011/0151850 A1 * | 6/2011 | Haaparanta et al. ......... 455/415 |
| 2011/0294478 A1 * | 12/2011 | Trivi et al. .................... 455/415 |
| 2012/0321064 A1 | 12/2012 | Czachor, Jr. et al. |
| 2013/0121482 A1 | 5/2013 | Gupta |
| 2013/0170635 A1 | 7/2013 | Kirkpatrick |
| 2013/0272515 A1 | 10/2013 | DeCesaris et al. |

FOREIGN PATENT DOCUMENTS

| | | |
|---|---|---|
| EP | 1783990 A1 | 5/2007 |
| GB | 2434939 A | 8/2007 |
| GB | 2480001 A | 11/2011 |

OTHER PUBLICATIONS

Yadav, et al., "SMSAssassin: Crowdsourcing Driven Mobile-based System for SMS Spam Filtering", In Proceedings of the 12th Workshop on Mobile Computing Systems and Applications, Hotmobile 2011 Phoenix, Arizona, Copyright 2011 ACM.

* cited by examiner

ANALYZING TELEPHONE CALLS

BACKGROUND OF THE INVENTION

The present invention relates generally to telephone calls, and more particularly to analyzing incoming telephone calls.

A telephone, or phone, is a telecommunications device that permits two or more users to conduct a conversation when they are not in the same vicinity of each other. A telephone converts sound, typically and most efficiently the human voice, into electronic signals suitable for transmission via cables or other transmission media over long distances, and replays such signals simultaneously in audible form to its user.

A telephone comprises a microphone (transmitter) to speak into and an earphone (receiver) which reproduces the voice of the distant person. In addition, most telephones contain a ringer which produces a sound to announce an incoming telephone call, and a dial used to enter a telephone number when initiating a call to another telephone.

Caller identification (CID) is a telephone service available in analog and digital phone systems and most voice over Internet Protocol (VoIP) applications. CID transmits a caller's number to the called party's telephone equipment during the ringing signal, or when the call is being set up but before the call is answered. Where available, CID can also provide a name associated with the calling telephone number. The information made available to the called party may be displayed on a telephone's display, on a separately attached device, or on a personal computer.

SUMMARY

Embodiments of the present invention disclose a method, computer program product, and system for managing incoming telephone calls. In one embodiment, in accordance with the present invention, the computer-implemented method includes managing incoming telephone calls. The method further includes receiving a telephone call from a first client device that is intended for a second client device. The method further includes identifying data associated with the first client device comprising at least one of: a telephone number, a name of a user associated with the first client device, an address of the user, and a business name associated with the first client device. The method further includes determining, by one or more computer processors, whether the identified data associated with the first client device matches data stored in a database that comprises data associated with client devices that correspond to unwanted telephone calls. The method further includes responsive to determining that the identified data associated with the first client device does match data stored in a database, determining, by one or more computer processors, whether to block the telephone call from the first client device to the second client device based on information comprising historical data associated with the first client device and preset information of the second client device.

DETAILED DESCRIPTION

Implementation of embodiments of the invention may take a variety of forms, and exemplary implementation details are discussed subsequently with reference to the Figures.

Figure 1:
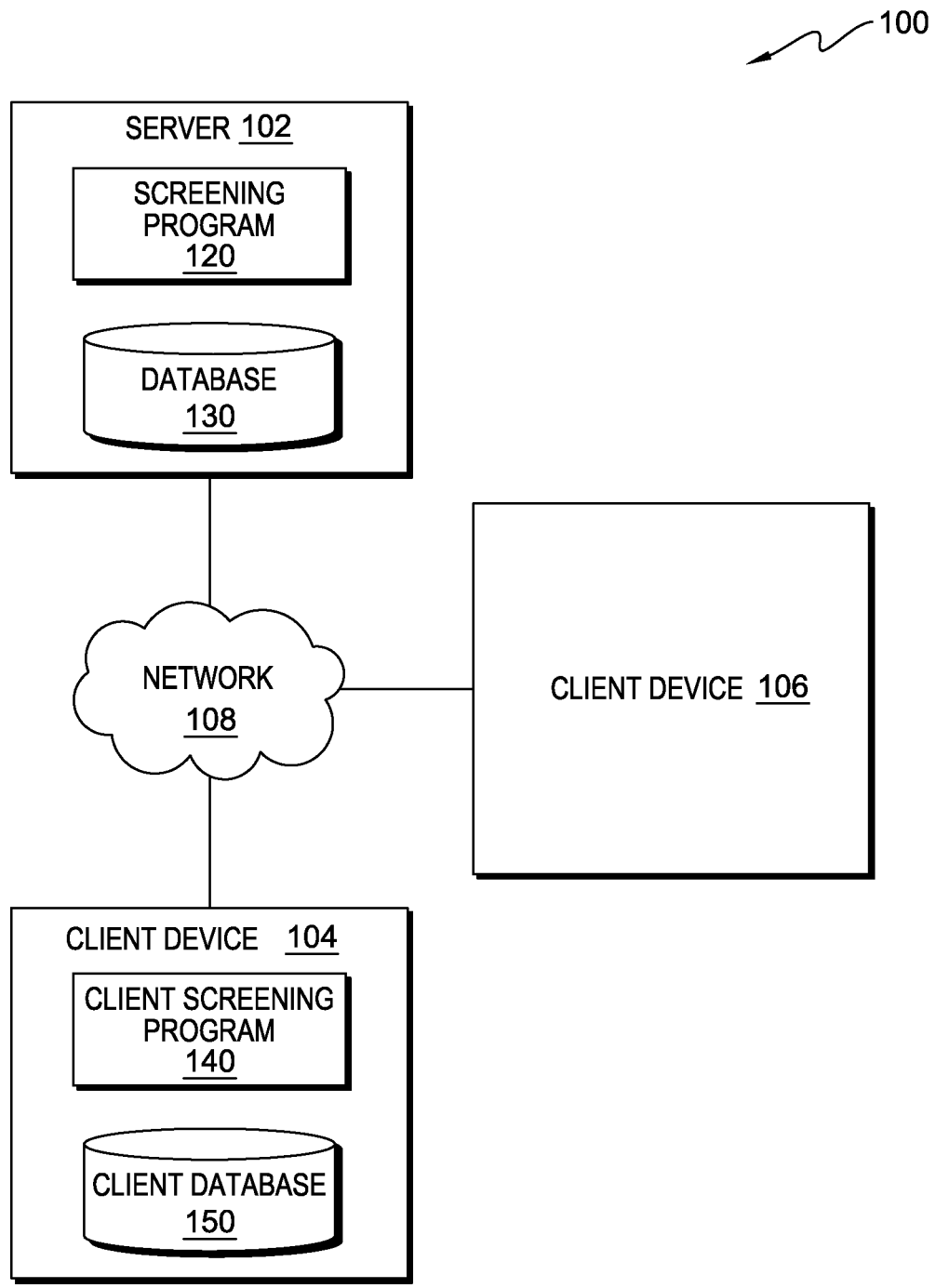
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, client devices 104 and 106, all interconnected over network 108. Network 108 represents, for example, a telecommunications network, a local area network (LAN), a wide area network (WAN), such as the Internet, or a combination of the three, and includes wired, wireless, and/or fiber optic connections. Network 108 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving and sending data. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client device 104 and client device 106 via network 108. In another embodiment, server 102 represents a computing system utilizing clustered computers and components to act as a single pool of seamless resources. In one embodiment, server 102 can be a server operating for a telephone service provider. In another embodiment, server 102 may operate independently and one or more service providers may utilize the capabilities of server 102. Server 102 includes screening program 120 and database 130. Server 102 may include components as depicted and described in further detail with respect to FIG. 4, in accordance with embodiments of the present invention.

In depicted distributed data processing environment 100, screening program 120 resides on server 102 and manages incoming phone calls to a device and determines if an incoming phone call is unwanted by the user of the receiving phone. In one embodiment, screening program 120 is a program operated by a telephone service provider and receives an incoming telephone call (phone call or call). In another embodiment, screening program 120 is a program operated independently and is utilized by multiple service providers. In an embodiment, screening program 120 determines if the telephone call should be routed (forwarded) to the intended recipient of the incoming telephone call (the number of the telephone dialed) based on previous actions of the user of the client device for the incoming telephone call and/or other pertinent information in a database that screening program 120 can access via network 108. In embodiments where a user of a client device receives an unwanted telephone call, screening program 120 receives feedback from a client device that received an unwanted call and determines if the client device generating the unwanted calls has reached a threshold number of unwanted calls. In another embodiment, screening program 120 is located on multiple client devices and operates in a peer to peer mode and not on server 102. In yet another embodiment, screening program 120 may operate on client devices in conjunction with one or more servers, such as server 102. Screening program 120 is depicted and described in further detail with respect to FIG. 2 and FIG. 3.

In the depicted embodiment, database 130 resides on server 102. In another embodiment, database 130 may reside elsewhere in distributed data processing environment 100, independently as a standalone database that is capable of communicating with server 102 via network 108. Database 130 may also reside on a client computing device, such as client device 104. A database is an organized collection of data. Database 130 is implemented with any type of storage device capable of storing data that is accessed and utilized by server 102, such as a database server, a hard disk drive, or a flash memory. In other embodiments, database 130 represents multiple storage devices within server 102. Database 130 stores information such as preferences associated with a client device (e.g., client device 104), phone numbers or phone call identification data to block for specific client devices, phone numbers or phone call identification data to block for all client devices, previous actions taken by telephone users to block a specific client device from receiving telephone calls from the specific client device in the future, etc. Identification data can be any data associated with a phone call that can be used to identify the caller. For example, a telephone number, a name, a designation such as blocked or private, or any other combinations of numbers, letters, or symbols.

In the depicted embodiment, client device 104 is one or more of a telephone, a desktop computer, a laptop computer, a tablet computer, a specialized computer server, a smart phone, any combination of telephone and/or computer, or any programmable electronic device capable of sending and/or receiving telephone calls and communicating with server 102 and another client device via network 108, and with various components and devices within distributed data processing environment 100. In one embodiment, client device 104 represents any telephone capable of executing machine readable program instructions and/or data storage as a standalone device or as used in conjunction with another electronic device via a network, such as network 108. A telephone, or phone, is a telecommunications device that permits two or more users to conduct a conversation when the users are not in the same vicinity of each other. A telephone converts sound, typically the human voice, into electronic signals suitable for transmission via cables or other transmission media over long distances, and replays such signals in audible form to a user. Client device 104 includes client screening program 140 and client database 150. Client device 104 may include components as depicted and described in further detail with respect to FIG. 4, in accordance with embodiments of the present invention.

In depicted distributed data processing environment 100, client screening program 140 resides on client device 104 for determining if an incoming phone call is unwanted by the user of the receiving phone. In an embodiment, client screening program 140 enables a user of client device 104 to provide feedback to screening program 120 by converting keypad entries into data indicating an unwanted call and then sending the data to screening program 120. In another embodiment, client screening program 140 blocks incoming telephone calls that are routed to client device 104 because the incoming calls are associated with user presets to block certain originations. The user presets may be stored in client database 150 or database 130.

In the depicted embodiment, client database 150 resides on client device 104. In another embodiment, client database 150 may reside elsewhere in distributed data processing environment 100, independently as a standalone database that is capable of communicating with client device 104, or various other client devices via network 108. Client database 150 may also reside on a server, such as server 102. A database is an organized collection of data. Client database 150 is implemented with any type of storage device capable of storing data that is accessed and utilized by client device 104, such as a database server, a hard disk drive, or a flash memory. In other embodiments, client database 150 represents multiple storage devices within client device 104. Client database 150 stores information, such as preferences for a client device, phone numbers or phone call identification data to block for specific client devices, phone numbers or phone call identification data to block for all client devices, previous actions taken by telephone users to block a specific client device, such as client device 104, from receiving telephone calls from the specific client device, such as client device 106, in the future, personal codes to delineate unwanted calls when typed in by a user, etc.

In the depicted embodiment, client device 106 is one or more of a telephone, a desktop computer, a laptop computer, a tablet computer, a specialized computer server, a smart phone, any combination of telephone and/or computer, or any programmable electronic device capable of sending and/or receiving telephone calls and communicating with server 102, and another client device (e.g., client device 104) via network 108 and with various components and devices within distributed data processing environment 100. A telephone, or phone, is a telecommunications device that permits two or more users to conduct a conversation when the users are not in the same vicinity of each other to be heard directly. A telephone converts sound, typically and most efficiently the human voice, into electronic signals suitable for transmission via cables or other transmission media over long distances, and replays such signals in audible form to a user. Client device 106 may include components as depicted and described in further detail with respect to FIG. 4, in accordance with embodiments of the present invention.

Figure 2:
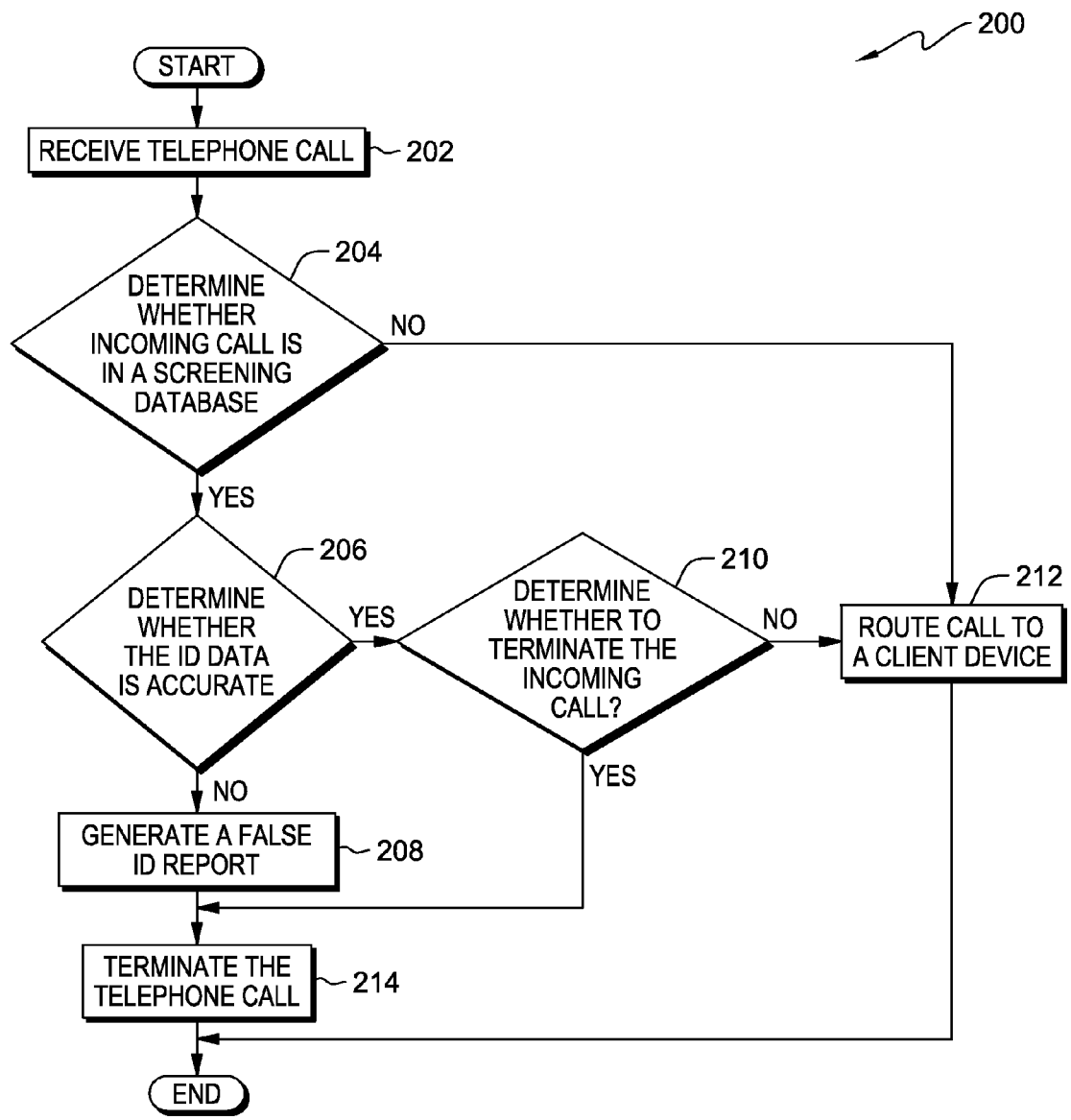
FIG. 2 is a flowchart depicting operational steps of a program for managing incoming phone calls to a device within the distributed data processing environment of FIG. 1, in accordance with an embodiment of the present invention.

FIG. 2 is a flowchart depicting operational steps of program 200, which is a function of screening program 120, in accordance with an embodiment of the present invention. Program 200 operates on server 102 and determines if an incoming phone call is unwanted without real time user feedback. In one embodiment, program 200 initiates in response to receiving an incoming telephone call. In another embodiment, program 200 is constantly monitoring multiple incoming telephone calls from various client devices in an enterprise environment and begins the operational steps of FIG. 2 when server 102 begins to receive a new incoming telephone call from a client device (e.g., client device 106).

Program 200 receives a telephone call (step 202). In one embodiment, program 200 receives a telephone call from client device 106 that is directed to client device 104. In one example, client device 106 dials the telephone number for client device 104, and the call first is routed through a service provider that utilizes program 200. Program 200 receives the information associated with the incoming telephone call (e.g., the number calling, the data representing a number such as private, a mixture of characters, the name of a company associated with the telephone number, etc.).

Program 200 determines whether the incoming number is in a screening database (decision 204). In one embodiment, program 200 determines whether the incoming telephone number (i.e., the telephone number corresponding to the received telephone call) or identification data from client device 106 is located in database 130. In an example, program 200 performs a scan of database 130 to determine if information associated with the incoming telephone call (e.g., telephone number, name, or other identification data) matches information previously stored in database 130. Program 200 can determine matches by various methods comprising: calls originating at the same time of day; a pause or delay before talking on a call; a call with a computer-generated voice; calls that have repeated to multiple users sequentially; a call that has been blocked by the user; etc. In one embodiment, program 200 accesses a social media website, email list, etc. of the user of client device 104 to determine if the user of client device 104 has unfriended or blocked potential callers and adds that information to database 130 to block telephone calls in the future. In another embodiment, program 200 searches a telephone directory to determine telephone numbers to block for the names of people the user of client device 104 has indicated to block. In yet another embodiment, program 200 may search court records to determine if there are legal proceedings against the user of client device 104, and program 200 may block calls from the opposing parties.

If program 200 determines that no information indicates the incoming telephone call matches information previously stored in a database (no branch, decision 204), then program 200 routes the call to the client device (step 212). In an embodiment, program 200 routes the incoming telephone call from client device 106 to client device 104. In one example, program 200 includes information associated with the incoming telephone call (e.g., the phone number associated with the incoming telephone call, a person's name or company name associated with the phone call, etc.) with the routed call to client device 104. In another example, no information regarding the incoming telephone call is available. In yet another example, program 200 includes information such as how many other client devices have blocked client device 106 from calling.

If program 200 determines that information regarding the incoming telephone number matches information previously stored in a database (yes branch, decision 204), then program 200 determines whether the identification data is accurate (decision 206). In an embodiment, program 200 determines whether the incoming telephone call representing that it is originating from client device 106 is actually originating from client device 106.

Program 200 determines identification data is not accurate (no branch, decision 206). In an example, client device 106 utilizes a program that causes the information regarding the incoming telephone call not to reflect accurate information corresponding to client device 106 but rather to reflect information regarding another client device (not depicted). In an example, program 200 may determine that the identification data is not accurate because the incoming telephone call includes metadata associated with the information regarding the incoming telephone number that causes client device 104 to interpret the identification data inaccurately (e.g., the identification data indicates a fake telephone number). In another example, the user of client device 104 may input a code on the client device after the user of client device 104 has received the call. The code may indicate that the identification data was not accurate for the incoming telephone call. In one example, program 200 may compare data received during the current telephone call to data received from the same originating telephone call device on a previous occasion.

If program 200 determines the identification data is not accurate (no branch, decision 206), then program 200 generates a false identification report (step 208). In an embodiment, program 200 generates a statement identifying a client device from which the call originated from, as well as the false information the client device tried to utilize. In one example, program 200 has determined that a call originating from client device 106 has tried to trick the user of client device 104 into believing that the call was originating from another client device (not depicted), such as a friend's client device that is known to the user of client device 104. Program 200 generates a report with information, such as the actual telephone identification data (i.e., telephone number), the registered name associated with client device 106, and any other information that screening program 120 may be able to gather. In one embodiment, program 200 may forward the generated false identification report to the authorities (e.g., a law enforcement agency). In another embodiment, program 200 may forward the generated false identification report to a person working for the service provider of client device 104.

If program 200 determines that the identification data is accurate (yes branch, decision 206), then program 200 determines whether to drop the incoming telephone call (decision 210). In an embodiment, program 200 determines whether to drop the incoming telephone call received from client device 106. In this embodiment, program 200 may determine to drop the incoming telephone call based on previous requests from the user of client device 104 and/or based off of information in database 130. In one example, program 200 may search database 130 for previous actions to block a caller with identification data that matches the identification data that is included in the incoming telephone call. In another example, the user of client device 104 may have a preset to block all calls that include identification data associated with a particular group or organization (e.g., to block all calls originating from a political organization, etc.). In yet another example, the user of client device 104 may have a preset to allow all telephone calls within a specific time frame.

Program 200 determines not to drop the incoming telephone call (no branch, decision 210). In an embodiment, program 200 determines not to drop the incoming telephone call from client device 106 to client device 104. In one example, program 200 locates the number or identification data for client device 106 in database 130. In this example, the identification data is not flagged by the user of client device 104 or by a preset threshold number of other users of program 200 as a call that should be dropped. In another example, the user of client device 104 may have a preset to drop all calls from newspapers except for the newspaper that the user of client device 104 receives. In this example, program 200 identifies the newspaper in database 130 and determines that the incoming call is from the newspaper that the user of client device 104 receives, and program 200 determines to not drop the call.

If program 200 determines not to drop the incoming telephone call (no branch, decision 210), then program 200 routes the telephone call to a client device (step 212). In an embodiment, program 200 routes the incoming telephone call from client device 106 to client device 104. In one example, program 200 includes information associated with the incoming telephone call (e.g., the phone number associated with the incoming telephone call, a person's name or company name associated with the phone call, etc.) with the routed call to client device 104. In another example, no information regarding the incoming telephone call is received by program 200; and therefore, no information is sent to client device 104. In yet another example, program 200 includes information such as how many other client devices block client device 106 from calling.

Program 200 determines to terminate the incoming telephone call (yes branch, decision 210). In an embodiment, program 200 determines to drop the incoming telephone call from client device 106. Program 200 may determine to terminate the incoming telephone call for numerous reasons, some of which may comprise: the user of client device 104 specifically blocks client device 106 from connecting (e.g., blocking all calls from a former spouse); the user of client device 104 may have entered a code on a previous occasion delineating that calls from client device 106 were unwanted; the user may have a preset blocking all calls from the category in which the owner of client device 106 falls, such as a survey group; a threshold number of telephone calls originating from client device 106 have been blocked by other client devices connected program 200 (as discussed in FIG. 3).

If program 200 determines to drop the incoming telephone call (yes branch, decision 210), program 200 terminates the telephone call (step 214). In one embodiment, program 200 terminates the telephone call to client device 104. In another embodiment, program 200 may send a notification via text, email, etc. with information pertaining to the terminated telephone call.

Figure 3:
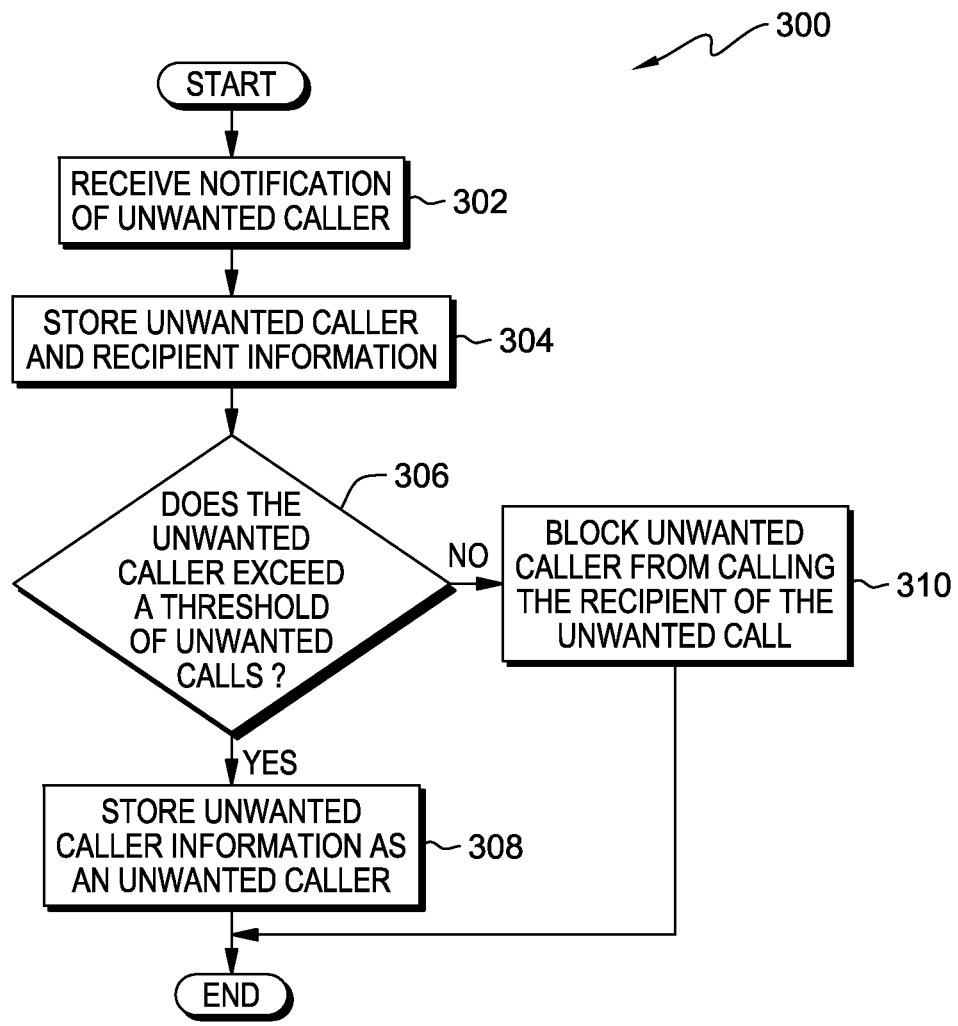
FIG. 3 is a flowchart depicting operational steps of a program for blocking future incoming phone calls and/or adding the phone call identification to a database based on received feedback from a user of a telephone that received the incoming phone call within the distributed data processing environment of FIG. 1, in accordance with an embodiment of the present invention.

FIG. 3 is a flowchart depicting operational steps of program 300, which is a function of screening program 120, in accordance with an embodiment of the present invention. Program 300 operates on server 102 to block future incoming phone calls and/or add phone call identification to a database based on received feedback from a user of a telephone (e.g., client device 104) that received the unwanted incoming phone call. In one embodiment, program 300 initiates in response to receiving feedback from a user of a client device while on a telephone call. In another embodiment, program 300 receives feedback from a user of a client device after an unwanted telephone call has ended.

Program 300 receives a notification of an unwanted caller (step 302). In an embodiment, program 300 receives a notification from client device 104 indicating that a call is unwanted. In an example, a user of client device 104 provides input of a specific sequence of keys and in response, client device 104 sends a notification to program 300 that indicates that client device 104 is on a telephone call with an unwanted caller (e.g., client device 106). In another example, the user of client device 104 may say a specific phrase to indicate that the telephone call is unwanted.

Program 300 stores the unwanted caller information and the recipient's information (step 304). In an embodiment, program 300 stores the unwanted caller information (e.g., information associated with client device 106), such as the phone number, caller name, caller address, time the call occurred, etc. Program 300 may also store the recipient of the unwanted call's information (e.g., information associated with client device 104), such as the phone number, user name, user address, the time the call occurred, etc. In various embodiments, program 300 stores the information for both the caller and the recipient in database 130, client database 150, or a combination of both.

Program 300 determines whether the unwanted caller exceeds a threshold of unwanted calls (decision 306). In an embodiment, program 300 determines whether the unwanted call (e.g., from client device 106) exceeds a threshold number of unwanted call notifications. In an example, program 300 has a preset of one hundred unwanted calls as a threshold. In this example, program 300 determines if a client device (e.g., client device 106) has been reported for unwanted calls by either the same client device (e.g., client device 104) or a combination of client devices (not depicted) that utilize program 300. In one embodiment, the threshold may also have a time element or restriction, such as one hundred unwanted phone calls within a month.

If program 300 determines that a client device exceeds the threshold of unwanted calls (yes branch, decision 306), then program 300 stores the client device information as an unwanted caller (step 308). In one embodiment, program 300 determines that client device 106 exceeds the threshold of one hundred unwanted phone calls, and program 300 stores information associated with client device 106 (e.g., the phone number, name of the user, address of the user, time of day of the unwanted calls, etc.) in database 130 and/or client database 150. In one embodiment, program 300 flags or adds metadata to the identification data associated with the unwanted caller so that program 300 can recognize the caller as unwanted and block the unwanted calls regardless of the client device a call originates from.

If program 300 determines that a client device has not exceeded the threshold of unwanted calls (no branch, decision 306), then program 300 blocks the unwanted call (e.g., originating from client device 106) from calling the recipient of the unwanted call in the future (step 310). In an embodiment, client device 106 has not exceeded the threshold number of unwanted phone calls; and therefore, program 300 blocks client device 106 from calling client device 104. In one embodiment, blocked client devices may become unblocked to a user of a client device (e.g., client device 104) after a set amount of time, or an amount of time preset by program 300. In one example, client device 106 has not exceeded the threshold number of unwanted calls but is blocked from future calls to client device 104 for a time period of one year, but if client device 106 exceeds the threshold number of unwanted telephone calls, then the time period may be extended.

In another embodiment, program 300 blocks future calls from client device 106 to client device 104 but also blocks all calls from client device 106 to client devices associated with client device 104. For example, program 300 blocks calls from client device 106 to client device 104 (a cellular phone), and two additional client devices (a home phone registered to the same user as client device 104, and a spouse's phone also connected to the same user as client device 104 through a bundled payment program).

In an example embodiment, screening program 120 receives a telephone call from client device 106, which is to be routed to client device 104. Screening program 120 determines that the number or location from which the call originates is also located in database 130. Screening program 120 determines that client device 106 has previously been reported as making unwanted telephone calls to other client devices (not depicted) but not to client device 104. Screening program 120 also determines that client device 106 is not over a threshold amount of unwanted calls; and therefore, routes the telephone call to client device 104. Screening program 120 includes data indicating that client device 106 has previous unwanted calls to other users of screening program 120 and any known identifications (e.g., name, number, address, etc.) related to client device 106. Screening program 120 receives data from client device 104 indicating that the user of client device 104 input a specific sequence of keys indicating that the call from client device 106 is unwanted. Screening program 120 stores the information that has been gathered during the telephone call such as the identification, address, time of call, that the call was unwanted by client device 104, etc. in database 130. Screening program 120 determines that the unwanted call from client device 106 reaches a threshold number of unwanted calls and stores information in database 130 to block calls from client device 104 to all users of screening program 120 for a predetermined amount of time.

Figure 4:
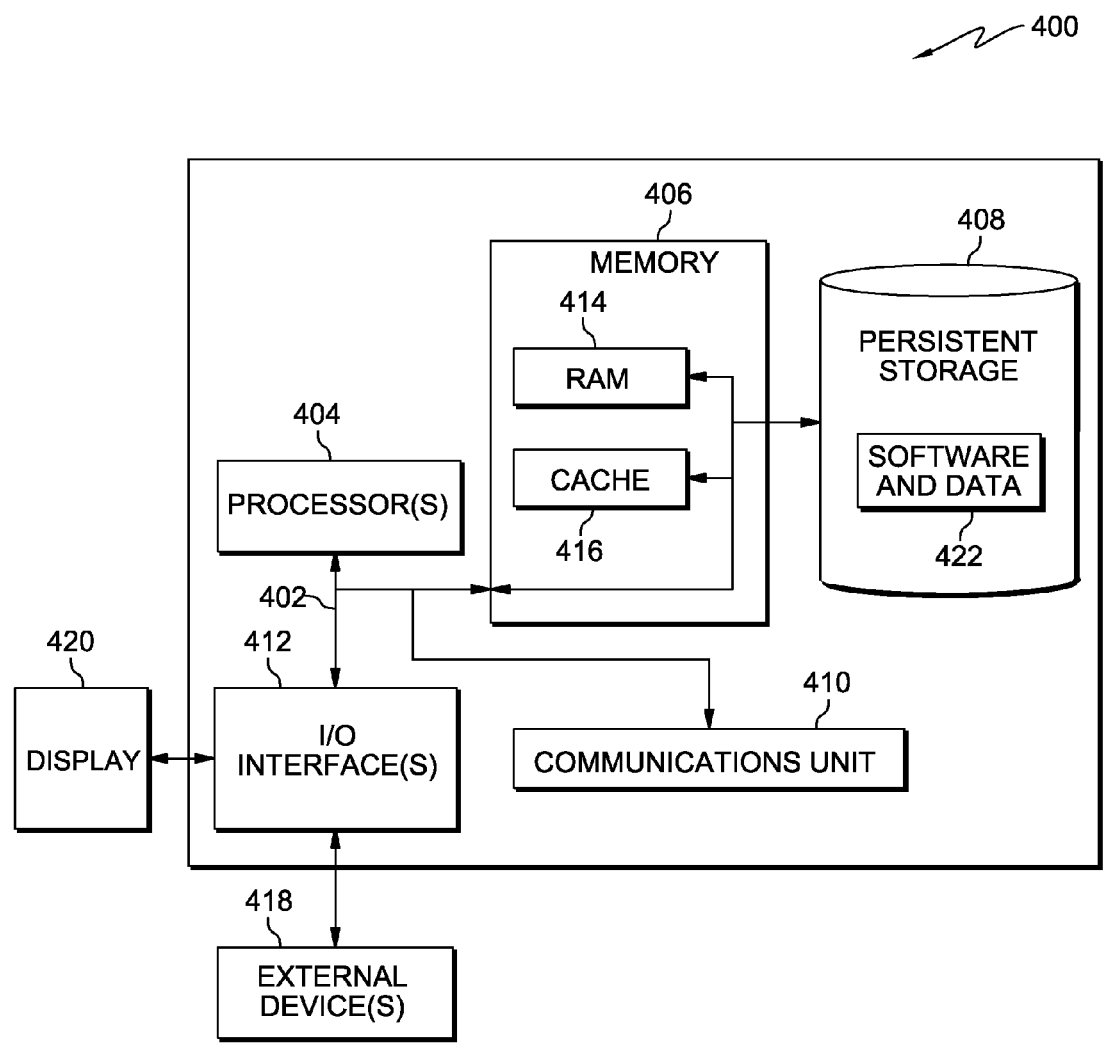
FIG. 4 depicts a block diagram of components of a server, and client devices of FIG. 1, in accordance with an embodiment of the present invention.

FIG. 4 depicts a block diagram of components of computer 400, which is representative of server 102, client devices 104 and 106, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to server 102, software and data 422 represents screening program 120 and database 130.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing incoming telephone calls, the method comprising:
  receiving, by one or more computer processors, a telephone call from a first client device that is intended for a second client device;
  identifying, by one or more computer processors, a telephone number of the first client device;
  receiving, by one or more computer processors, an indication from the second client device that the first client device is an unwanted telephone call to be counted towards a threshold number of unwanted telephone calls;
  determining, by one or more computer processors, if data associated with the first client device indicates that the telephone number of the first client device has reached a threshold number of total unwanted telephone calls to one or more client devices;
  determining, by one or more computer processors, whether the identified data associated with the first client device matches data stored in a database that comprises data associated with client devices that correspond to unwanted telephone call, wherein determining, by one or more computer processors, whether the identified data associated with the first client device matches comprises:

determining, by one or more processors, whether social media information associated with the first client device matches data stored in a database that comprises data associated with client devices that correspond to unwanted telephone calls;

wherein the social media information includes information from social media websites corresponding to the first client device and the second client device; and wherein the social media information includes an action, wherein an action comprises at least unfriending or blocking of the first client device by the second client device; and responsive to determining that the first client device has not reached a threshold number of unwanted telephone calls, and responsive to determining that an action comprising at least unfriending or blocking of the first client device by the second client device, blocking, by one or more computer processors, the first client device from connecting a telephone call to the second client device as an unwanted telephone call.

2. A computer system for managing incoming telephone calls, the computer system comprising:

one or more computer processors;
one or more computer readable storage media;
program instructions stored on the computer readable storage media for execution by at least one of the one or more computer processors, the program instructions comprising: program instructions to receive a telephone call from a first client device that is intended for a second client device;
program instructions to identify data associated with the first client device comprises social media information;
program instructions to determine whether the identified data associated with the first client device matches data stored in a database that comprises data associated with client devices that correspond to unwanted telephone calls; and
responsive to program instructions to determine that the identified data associated with the first client device does match data stored in a database, program instructions to determine whether to block the telephone call from the first client device to the second client device based on information comprising historical data associated with the first client device and preset information of the second client device;
program instructions to determine whether social media information associated with the first client device matches data stored in a database that comprises data associated with client devices that correspond to unwanted telephone calls and blocking the telephone call from the first client device based upon social media information;
wherein the social media information includes information from social media websites corresponding to the first client device and the second client device; and
wherein the social media information includes an action, wherein an action comprises at least unfriending or blocking of the first client device by the second client device.

3. The computer system of claim 1, wherein data stored in a database comprises at least one of: the number of unwanted calls the first client device has previously made to other client devices; an indication of if the first client device has reached a threshold number of unwanted calls to other client devices; and an indication if the first client device has previously made an unwanted call to the second client device.

4. The computer system of claim 2, further comprising program instructions to:
receive data from a client device indicating a telephone call is unwanted; and
store the received data in the database.

5. The computer system of claim 2, further comprising program instructions to:
determine if data associated with the first client device indicates that the first client device has reached a threshold number of total unwanted telephone calls to one or more client devices; and
in response to determining that the first client device has reached a threshold number of unwanted telephone calls, program instructions to block the first client device from connecting a telephone call to another client device.

6. The computer system of claim 2, further comprising program instructions to:
identify a telephone number of the first client device;
determine if data associated with the first client device indicates that the telephone number of the first client device has reached a threshold number of total unwanted telephone calls to one or more client devices; and
in response to determining that the first client device has not reached a threshold number of unwanted telephone calls, program instructions to block the first client device from connecting a telephone call to a client device that has previously indicated to block the first client device.

7. The computer system of claim 2, further comprising program instructions to:
receive data from a client device indicating a telephone call is to be blocked based on one or more of: occurring at a same time of day, a company associated with the originating client device, court records, and social media information; and
store data received from the client device indicating a telephone call is to be blocked based on one or more of: occurring at the same time of day, the company associated with the originating client device, court records, and social media information.

* * * * *